US007599486B1

(12) United States Patent
Rivas

(10) Patent No.: US 7,599,486 B1
(45) Date of Patent: Oct. 6, 2009

(54) TELESCOPIC BOOM WITH CONDUCTIVE SPRING CONNECTORS

(75) Inventor: Pedro A. Rivas, Tijuana, CA (US)

(73) Assignee: Plantronics, Inc., Santa Cruz, CA (US)

( * ) Notice: Subject to any disclaimer, the term of this patent is extended or adjusted under 35 U.S.C. 154(b) by 676 days.

(21) Appl. No.: 11/317,202

(22) Filed: Dec. 23, 2005

(51) Int. Cl.
*H04M 9/00* (2006.01)
*H04M 1/00* (2006.01)

(52) U.S. Cl. .............................. 379/433.03; 379/433.01

(58) Field of Classification Search ............ 379/420.03, 379/430, 431, 433.01, 433.03, 433.12; 381/177, 381/355, 361, 362, 375, 376, 381; 455/575.1, 455/575.2
See application file for complete search history.

(56) References Cited

U.S. PATENT DOCUMENTS

| | | | | |
|---|---|---|---|---|
| 3,735,021 | A * | 5/1973 | Bonis et al. | 174/86 |
| 5,999,822 | A * | 12/1999 | Wicks et al. | 455/575.1 |
| 2003/0132884 | A1 * | 7/2003 | Ragner et al. | 343/702 |

* cited by examiner

*Primary Examiner*—Curtis Kuntz
*Assistant Examiner*—Phylesha Dabney
(74) *Attorney, Agent, or Firm*—Intellectual Property Law Office of Thomas Chuang

(57) ABSTRACT

Systems and methods for a telescopic boom with conductive spring connectors are disclosed. The system generally includes conductive spring connectors which extend and retract as the telescopic boom extends and retracts.

29 Claims, 7 Drawing Sheets

TELESCOPIC BOOM WITH CONDUCTIVE SPRING CONNECTORS

BACKGROUND OF THE INVENTION

Communications headsets are used in a wide range of applications. Some headsets utilize booms which place an acoustic sensing point (the point at which the headset receives sound waves) near the user's mouth. In some telephone headsets, the microphone is located at the distal end of the boom so that it may be placed near the user's mouth. These headsets require electrical wires which travel the length of the interior of the boom to couple to the microphone, thereby connecting the microphone to a transmit path amplifier or other circuit. The near end of the boom is generally connected to a receiver adapted to rest on a portion of the user's head, such as the user ear.

In some headset designs, a telescopic boom is used so that the position of the acoustic sensing point may be varied by the user across a limited range of adjustable distances from the user's mouth, either for appearance or to improve voice detection. In addition, the telescopic boom allows for a more compact form for storage when it is in retracted state. Hence, a user can stow a headset with the boom in a retracted mode, and in the extended mode the boom can be used for communication.

However, conventional telescopic booms do not offer good management of the electrical leads running the length of the boom which are coupled to the microphone. Such leads must be long enough to allow the boom to reach full extension. However, management of the electrical leads when the boom is in a retracted position is problematic. The space available within the boom to hold the extra length of electrical lead may be limited, adversely affecting the allowable extension length of the telescopic boom. Cycling of the electrical leads between a retracted state and extended state may result in failure of the leads or lead connections. Prior art cable management schemes include the use of internal guide ribs. However, such solutions can generally handle only short lengths of wire.

As a result, there is a need for improved methods and apparatuses for telescopic booms.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1A:
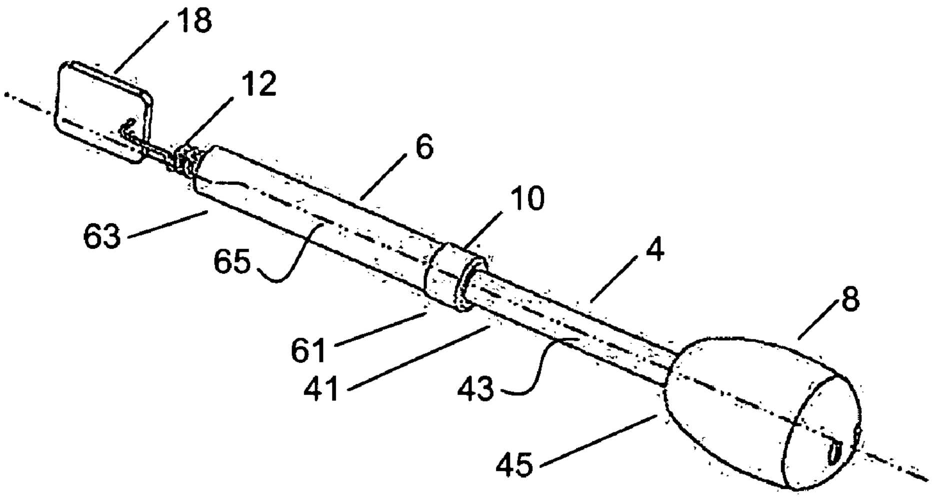
FIG. 1A illustrates a perspective view of a telescopic boom with conductive spring connectors in an extended position.

Methods and apparatuses for telescopic boom with conductive spring connectors are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Generally, this description describes a method and apparatus for a telescopic boom assembly with conductive spring connectors. The assembly eliminates the use of conventional cables (also referred to herein as wires or leads) running the length of the boom. As a result, cable management and failure issues that arise when using cables in a telescopic boom are reduced. The telescopic boom assembly may be collapsed to a retracted state when not in use, allowing for improved stowage and portability. While the present invention is not necessarily limited to headset booms, various aspects of the invention may be appreciated through a discussion of various examples using this context.

According to an example of the present invention, a microphone boom assembly includes a boom having a first end closest to the headset amplifier or receiver, and a second end to be placed closer to the user mouth. The boom has a hollow outer tube and a hollow inner tube. The hollow inner tube is concentric to the outer tube and ensleeved by the hollow outer tube, and may be extended and retracted telescopically with respect to the hollow outer tube. A microphone is disposed at the second end of the boom. A first conductive spring is disposed within the boom and coupled to the microphone. A second conductive spring is disposed within the boom and coupled to the microphone. The first conductive spring and second conductive spring extend and retract corresponding to extension and retraction of the hollow inner tube.

In another example of the invention, a microphone boom assembly includes an outer tube and an inner tube concentric to the outer tube and ensleeved by the outer tube. The inner tube may be moved in an extension direction and a retraction direction within the outer tube such that there is a varying length of overlap between the outer tube and inner tube. The overall length of the microphone boom assembly can therefore be selectively adjusted by the user. A microphone is affixed at an end of either the inner tube or outer tube. One conductive spring is disposed within the inner tube and outer tube and coupled to the microphone. Another conductive spring is also disposed within the inner tube and outer tube and coupled to the microphone. Both conductive springs extend and retract corresponding to movement of the inner tube within the outer tube as the user adjusts the overall length of the microphone boom assembly.

Figure 1B:
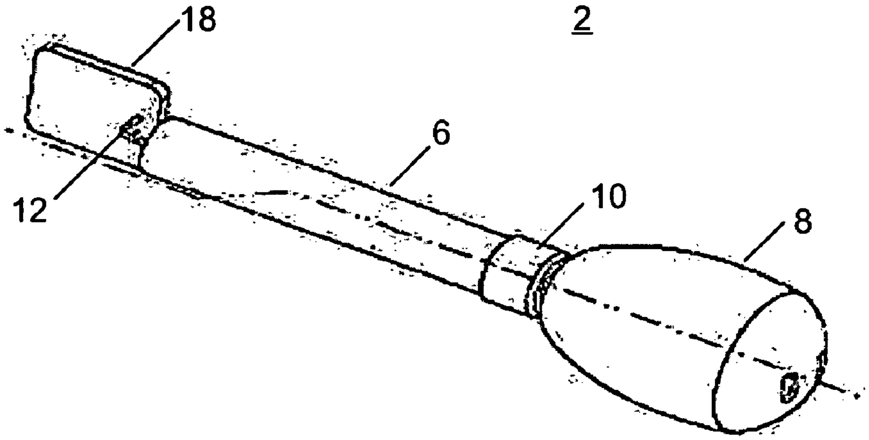
FIG. 1B illustrates a perspective view of a telescopic boom with conductive spring connectors in a retracted position.

FIGS. 1A and 1B illustrate a perspective view of a telescopic boom 2 with conductive spring connectors in an extended and retracted position, respectively. The telescopic boom 2 includes an inner boom tube 4, outer boom tube 6, conductive springs 12, microphone housing 8, and printed circuit board 18.

In FIG. 1A, inner boom tube 4 has been extended in a telescopic fashion to an extended length. In FIG. 1B, inner boom tube 4 has been retracted in a telescopic fashion into outer boom tube 6. Although only two boom tubes are shown in the present example, additional telescoping tubes may be used in order to shorten the length of the boom in a completely retracted state.

Figure 2:
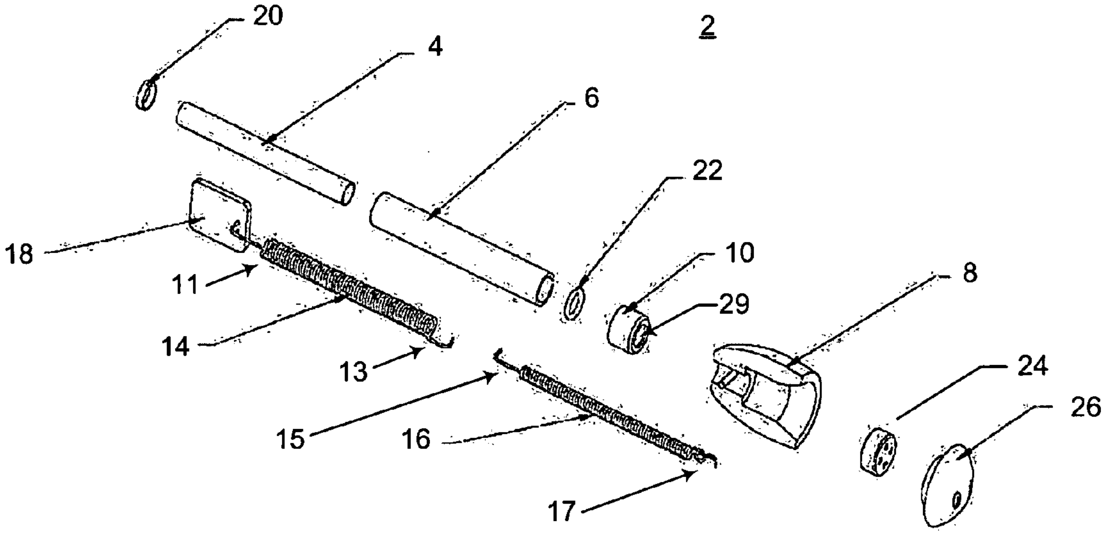
FIG. 2 illustrates a disassembled view of a telescopic boom with conductive spring connectors in one example of the invention.

FIG. 2 illustrates a disassembled view of a telescopic boom 2 with conductive spring connectors in one example of the invention. The telescopic boom 2 includes an inner boom tube 4, outer boom tube 6, microphone 24, inner conductive spring 14, and outer conductive spring 16. Additional components utilized to form the telescopic boom 2 include a lock ring 20, friction element 22, retainer 10, microphone housing 8, microphone cap 26, and printed circuit board (PCB) 18.

Figure 8:
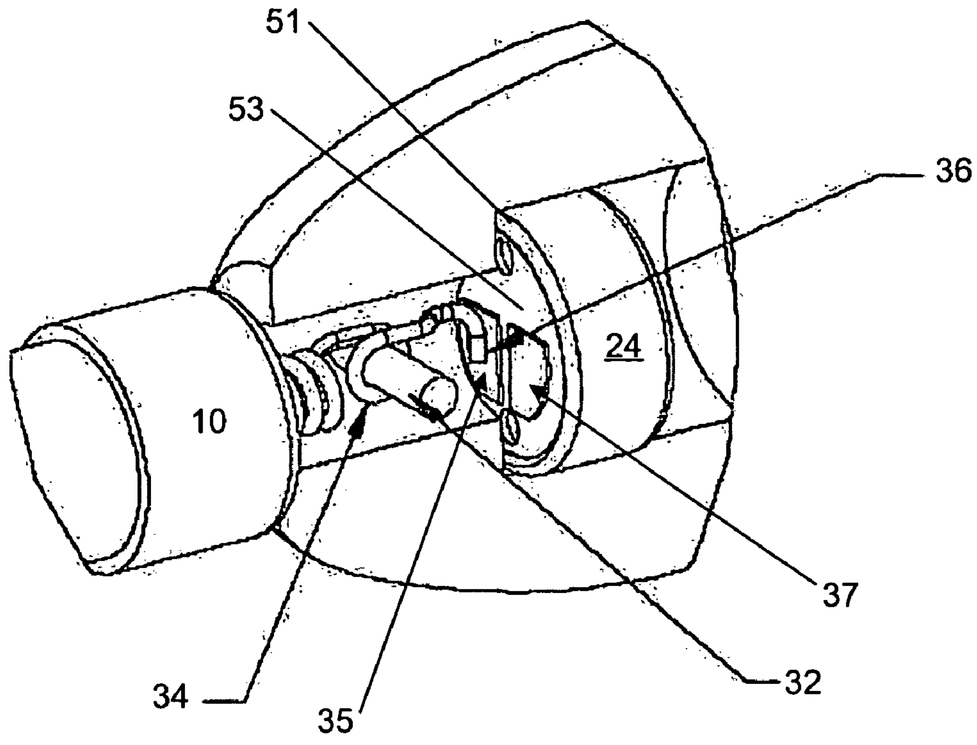
FIG. 8 illustrates coupling of the spring conductive spring connectors to a microphone.

Microphone 24 is installed at the distal end of the telescopic boom in a microphone housing having a microphone cap 26 with apertures to allow the passage of sound waves to the microphone 24. The microphone housing 8 includes a cavity region adapted to secure microphone 24 and any associated microphone boots. Referring to FIG. 8, microphone 24 includes a housing 51 including a printed circuit board 53 having conductive traces thereon for electrically coupling a conductor to a microphone transducer element. Printed circuit board 51 includes solder connection pad 35 and connection pad 37. Microphone cap 26 may utilize an open cell foam lining to reduce extraneous noise such as wind or puff noise. In a further example, microphone housing 8 does not require a separate cover and microphone cap 26 is therefore not needed.

Inner conductive spring 16 has a diameter less than the diameter of the outer conductive spring 14. When assembled, inner conductive spring 16 is installed within outer conductive spring 14. In one example, an insulation material is disposed between inner conductive spring 16 and outer conductive spring 14. For example, an insulation sleeve may be used. In a further example, both the inner conductive spring 16 and outer conductive spring 14 have an insulating dielectric outer jacket. For example, a polyvinyl chloride or a polyurethane blend may be used. In still another example, enamel is used. In one example, the insulation jacket may have a thickness between 0.005 and 0.125 inches.

One end of inner conductive spring 16 and outer conductive spring 14 is coupled to microphone 24. The second end of inner conductive spring 16 and outer conductive spring 14 is coupled to PCB 18. The inner conductive spring 16 and outer conductive spring 14 conduct electrical signals between microphone 24 and PCB 18. For example, a transmit amplifier circuit may be located at PCB 18 to receive the microphone signal. PCB 18 is installed in the main housing of a headset. One of ordinary skill in the art will recognize that a variety of techniques are used to couple the boom to the main housing of the headset.

Figure 3:
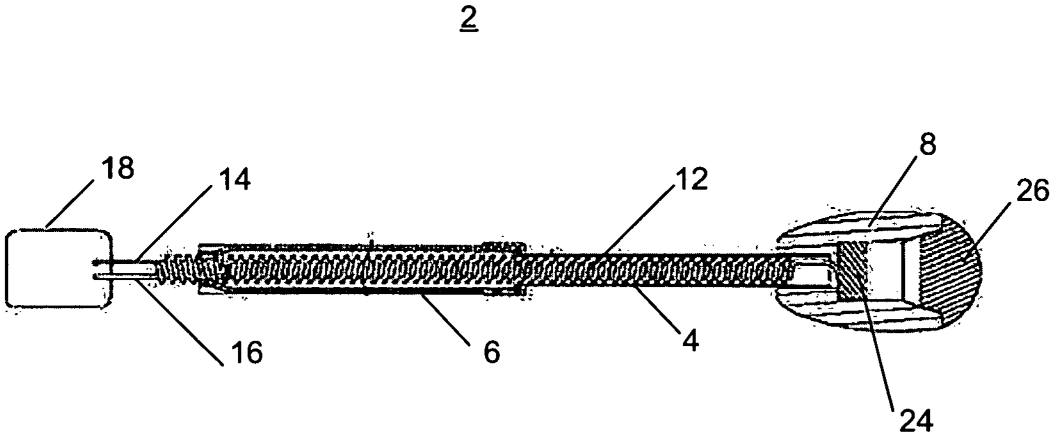
FIG. 3 illustrates conductive spring connectors disposed within the telescopic boom.
Figure 9:
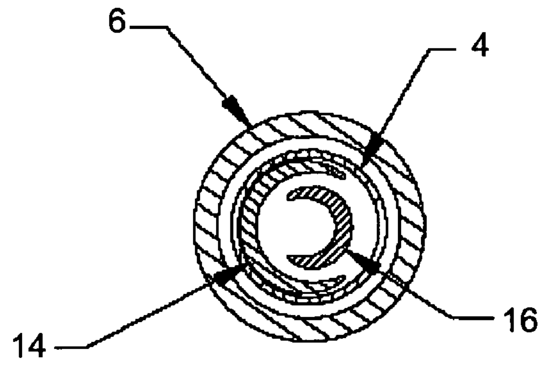
FIG. 9 illustrates an end view of the telescopic boom with conductive spring connectors.

Referring to FIG. 3, both inner conductive spring 16 and outer conductive spring 14 are installed within the hollow interior of inner boom tube 4 and outer boom tube 6. FIG. 9 illustrates an end view of the telescopic boom with an inner conductive spring 16 installed within outer conductive spring 14, both of which are installed within inner boom tube 4 and outer boom tube 6.

Inner conductive spring 16 and outer conductive spring 14 may, for example, be fabricated from copper with zinc plating, zinc or stainless steel, music wire with zinc or tin plating. Where the material used is not conducive to solder connections, alternative clamping techniques such as mechanical crimping with cable or PCB quick connectors may be used. In one example, the thickness of the conductive springs ranges from 0.004 inches (AWG 6/0) to 0.095 inches (AWG 33). In one example, the spring constant may be varied from 0.1 lb/in to 1.0 lb/in. Those of ordinary skill in the art will recognize that any conductive material having similar electrical and mechanical characteristics and which may be used to for the inner conductive spring 16 and outer conductive spring 14.

Referring again to FIG. 1A, outer boom tube 6 has an end 61, an end 63, an outer surface 65, and a hollow interior. A concentric inner boom tube 4 capable of being ensleeved by outer boom tube 6 forms the telescopic boom. Inner boom tube 4 has an end 41, an end 45, an outer surface 43, and a hollow interior. The end 41 of the inner boom tube 4 is secured to microphone housing 8.

Figure 5:
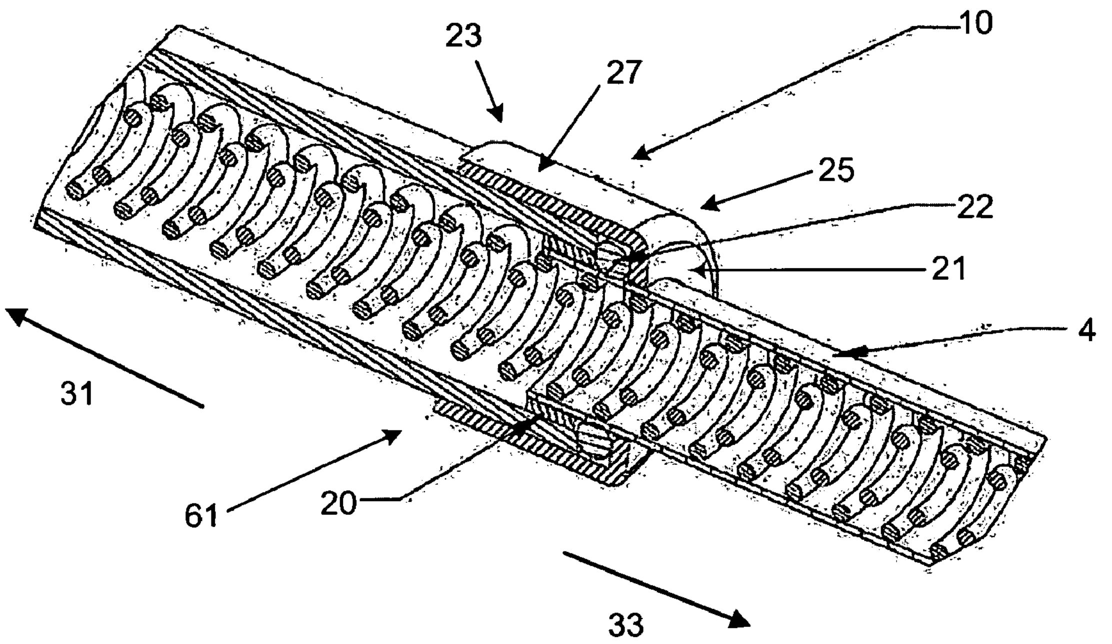
FIG. 5 illustrates a cutaway view of the telescopic boom with conductive spring connectors.

Referring to FIG. 2 and FIG. 5, a retainer 10 with an end 23, an end 25, an outer surface 27 and an end cap 21 is provided to hold friction element 22 in a desired static position. Retainer 10 is cylindrically shaped with a diameter greater than the diameter of outer boom tube 6 such that retainer 10 may be affixed over the end 61 of outer boom tube 6. End cap 21 includes a circular aperture 29 with a diameter smaller than the diameter of outer boom tube 6, but greater than the diameter of inner boom tube 4 such that the inner boom tube 4 may be inserted through the circular aperture 29 into outer boom tube 6.

Figure 4:
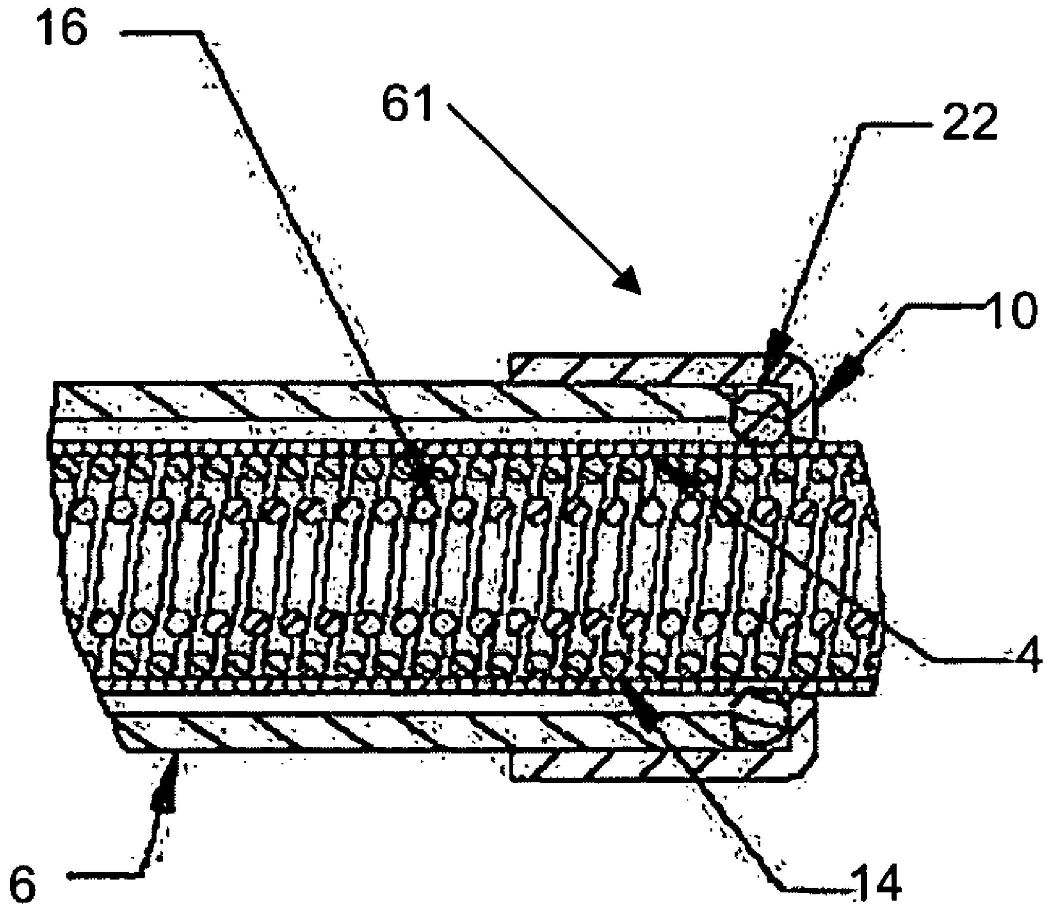
FIG. 4 illustrates a cross sectional view of the telescopic boom with conductive spring connectors in one example of the invention.

FIG. 4 illustrates a cross sectional view of the telescopic boom with conductive spring connectors in one example of the invention. FIG. 5 illustrates a cutaway view of the telescopic boom with conductive spring connectors. Referring to FIG. 4 and FIG. 5, a friction element 22 is disposed inside the outer end surface 21 of the retainer 10 adjacent an end 61 of outer boom tube 6. Friction element 22 prevents an extended inner boom tube 4 from undesirably retracting due to the conductive spring force. For example, friction element 22 is an o-ring or washer composed of a polyurethane material with an inner diameter slightly greater than the diameter of the inner boom tube 4 so that the friction element may be tightly fit over the inner boom tube 4. The friction element 22 has an outer diameter approximately equal to the diameter of the outer boom tube 6 such that it is held in place between the retainer 10 and end 61 of outer boom tube 6. As a result of this arrangement, the friction element 22 exerts a friction force on the outer surface 43 of inner boom tube 4. The friction force on the outer surface 43 is sufficient to prevent the inner boom tube 4 from retracting in a retraction direction 31 as a result of the pull force exerted by inner conductive spring 16 and outer conductive spring 14 following extension of inner boom tube 4 (and corresponding extension of inner conductive spring 16 and outer conductive spring 14) by a user. A user may overcome the friction force with user applied force by extending the inner boom tube 4. The friction element 22 thereby allows the inner boom tube 4 to be fixed at a user-determined telescopic extension length.

Figure 6:
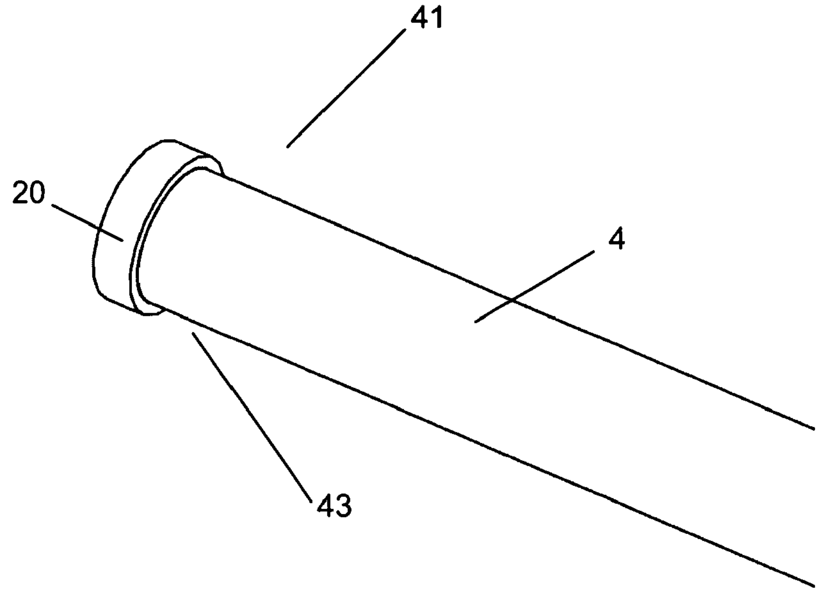
FIG. 6 illustrates an inner boom tube with attached lock ring.

FIG. 6 illustrates an inner boom tube 4 with an attached lock ring 20 used to prevent over stroke. Referring to FIG. 6, lock ring 20 is affixed at end 41 of the inner boom tube 4 over the outer surface 43. End 41 is inserted into outer boom tube 6. For example, the lock ring 20 may be affixed using an adhesive material. Referring again to FIG. 5, the diameter of the lock ring 20 is greater than the inner diameter of the friction element 22. As a result, the lock ring 20 will abut the friction element 22 when the inner boom tube 4 is at full extension in an extension direction 33, thereby preventing further extension and resulting separation of the inner boom tube 4 from the outer boom tube 6.

Figure 7:
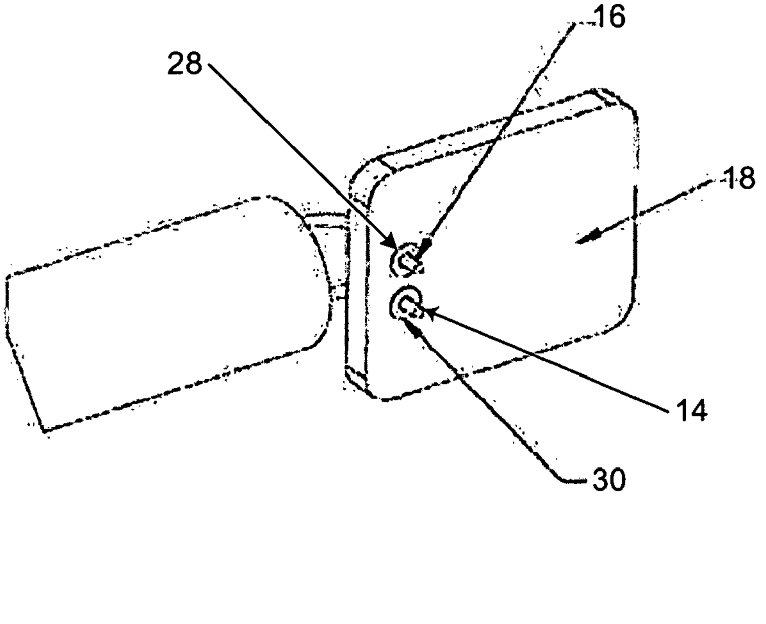
FIG. 7 illustrates coupling of the conductive spring connectors to a printed circuit board.

FIG. 7 illustrates coupling of the conductive spring connectors to a printed circuit board 18. Referring to FIG. 2 and FIG. 7, outer conductive spring 14 has an end 11 and an end 13. Inner conductive spring 16 has an end 15 and an end 17. First end 11 of outer conductive spring 14 and first end 15 of inner conductive spring 16 are coupled to a PCB 18. In one example of the invention, PCB 18 includes thru-holes in which first end 11 and first end 15 are inserted and electrically coupled to solder pad 28 and solder pad 30.

FIG. 8 illustrates coupling of the spring conductive spring connectors to a microphone using a strain relief mechanism. The strain relief mechanism is utilized to avoid damage to or disconnection of the coupling point between the spring conductive contact and the microphone terminal. For clarity only the coupling of an outer conductive spring 14, for example, is illustrated in FIG. 8. In the example shown in FIG. 8, the strain relief mechanism utilizes a pin 32 attached to the inner surface of microphone housing 8 and a strain relief loop 34 at end 13 of outer conductive spring 14. The strain relief loop 34 is placed on pin 32 and the spring termination 36 is soldered to microphone connection pad 35. In operation, as outer conductive spring 14 is extended and retracted, the spring forces are placed on pin 32 rather than the solder weld of spring termination 36 and microphone connection pad 35. In a similar manner, an inner conductive spring 16 may be coupled to microphone connection pad 37. The strain relief mechanism shown in FIG. 8 may also be utilized at end 11 of outer conductive spring 14 and end 15 of inner conductive spring 16 to couple outer conductive spring 14 and inner conductive spring 16 to PCB 18 or other circuit.

In further example of the invention, a variety of strain relief techniques or mechanisms may be utilized. For example, the termination points of inner conductive spring 16 and outer conductive spring 14 may be anchored to the boom or microphone housing, where the anchoring point also serves as an electrical terminal. A connecting wire may then be connected between this electrical terminal and the microphone or PCB. Microphone 24 may use a variety of connection terminals, pads, or other coupling means to connect to inner conductive spring 16 and outer conductive spring 14.

Inner boom tube 4 and outer boom tube 6 may either be rigid or flexible. In an example where inner boom tube 4 and outer boom tube 6 are flexible, inner conductive spring 16 and outer conductive spring 14 advantageously may flex to conform to a bend in inner boom tube 4 and outer boom tube 6.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: the means by which the position of the outer boom and inner boom is maintained against the spring conductor forces, the means by which the spring conductors are coupled to the microphone; whether the microphone is coupled to the end of an inner boom tube or an outer boom tube; and the means by which the inner boom tube and outer boom tube are prevented from accidentally separating. Furthermore, the shapes and sizes of the illustrated boom and microphone housing and components may be altered. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A microphone boom assembly comprising:
a boom having a first end and a second end, comprising:
a hollow outer tube;
a hollow inner tube concentric to the outer tube and ensleeved by the hollow outer tube, wherein the hollow inner tube may be extended and retracted telescopically with respect to the hollow outer tube;
a microphone disposed at the second end;
a first conductive spring disposed within the boom and coupled to the microphone; and
a second conductive spring disposed within the boom and coupled to the microphone, wherein the first conductive spring and second conductive spring extend and retract corresponding to extension and retraction of the hollow inner tube.

2. The microphone boom assembly of claim 1, further comprising a printed circuit board disposed at the first end, wherein the printed circuit board is coupled to the first conductive spring and the second conductive spring.

3. The microphone boom assembly of claim 1, wherein the printed circuit board comprises a transmit amplifier circuit.

4. The microphone boom assembly of claim 1, further comprising a microphone housing coupled to the boom at the second end, wherein the microphone is disposed within the microphone housing.

5. The microphone boom assembly of claim 1, wherein the first conductive spring has a first diameter and the second conductive spring has a second diameter, wherein the first diameter is less than the second diameter and the first conductive spring is disposed within the second conductive spring.

6. The microphone boom assembly of claim 5, wherein an insulation sleeve is disposed between the first conductive spring and the second conductive spring.

7. The microphone boom assembly of claim 1, wherein the first conductive spring is covered by a first insulation jacket and the second conductive spring is covered by a second insulation jacket.

8. The microphone boom assembly of claim 1, further comprising a friction ring between the hollow inside tube and hollow outer tube, wherein the ring exerts a friction force on the hollow inner tube greater than a retractive spring force when the first conductive spring and second conductive spring are in an extended position.

9. The microphone boom assembly of claim 8, wherein the friction ring comprises polyurethane.

10. The microphone boom assembly of claim 8, further comprising a retainer disposed over an end of the hollow outer tube for holding the friction ring in a static position.

11. The microphone boom assembly of claim 1, wherein the hollow inner tube comprises a lock ring for preventing the hollow inner tube from separating from the hollow outer tube.

12. The microphone boom assembly of claim 4, wherein the microphone housing comprises a pin disposed on an inner surface for receiving a first conductive spring strain relief loop or a second conductive spring strain relief loop.

13. A microphone boom assembly comprising:
a boom having a first end and a second end, comprising:
a hollow outer tube;
a hollow inner tube concentric to the outer tube and ensleeved by the hollow outer tube, wherein the hollow inner tube may be extended and retracted telescopically with respect to the hollow outer tube;

a transducer disposed at the second end;

a first spring disposed within the boom and adapted to conduct electrical signals from the transducer; and a second spring disposed within the boom and adapted to conduct electrical signals from the transducer.

14. The microphone boom assembly of claim 13, further comprising a circuit disposed at the first end adapted to receive an electrical signal on the first spring and the second spring.

15. The microphone boom assembly of claim 13, further comprising a housing means for housing the microphone.

16. The microphone boom assembly of claim 13, wherein the first spring is disposed within the second spring.

17. The microphone boom assembly of claim 13, further comprising an insulating means between the first spring and the second spring for insulating the first spring and the second spring.

18. The microphone boom assembly of claim 13, wherein the first spring is covered by a first insulation and the second spring is covered by a second insulation.

19. The microphone boom assembly of claim 13, further comprising a friction means for maintaining the hollow inner tube in a fixed position relative to the outer tube.

20. The microphone boom assembly of claim 13, wherein the hollow inner tube comprises a locking means for preventing the hollow inner tube from separating from the hollow outer tube.

21. The microphone boom assembly of claim 13, further comprising a first spring strain relief means and a second spring strain relief means for reducing strain on an electrical connection between the first spring and the transducer and the second spring and the transducer.

22. A microphone boom assembly comprising:

an outer tube;

an inner tube concentric to the outer tube and ensleeved by the outer tube, wherein the inner tube may be moved in an extension direction and a retraction direction within the outer tube thereby producing a varying length of overlap between the outer tube and inner tube;

a microphone affixed at an end of either the inner tube or outer tube;

a first conductive spring disposed within the inner tube and outer tube and coupled to the microphone; and a second conductive spring disposed within the inner tube and outer tube and coupled to the microphone, wherein the first conductive spring and second conductive spring extend and retract corresponding to movement of the inner tube within the outer tube.

23. The microphone boom assembly of claim 22, wherein the first conductive spring has a first diameter and the second conductive spring has a second diameter, wherein the first diameter is less than the second diameter and the first conductive spring is disposed within the second conductive spring.

24. The microphone boom assembly of claim 23, wherein an insulation sleeve is disposed between the first conductive spring and the second conductive spring.

25. The microphone boom assembly of claim 22, wherein the first conductive spring is covered by a first insulation jacket and the second conductive spring is covered by a second insulation jacket.

26. The microphone boom assembly of claim 22 further comprising a friction ring, wherein the ring exerts a friction force on the inner tube greater than a retractive spring force when the first conductive spring and second conductive spring are in an extended position.

27. The microphone boom assembly of claim 26, wherein the friction ring comprises polyurethane.

28. The microphone boom assembly of claim 26, further comprising a retainer disposed over an end of the outer tube for holding the friction ring in a static position.

29. The microphone boom assembly of claim 22, wherein the inner tube comprises a lock ring for preventing the inner tube from separating from the outer tube.

* * * * *

UNITED STATES PATENT AND TRADEMARK OFFICE

CERTIFICATE OF CORRECTION

PATENT NO. : 7,599,486 B1
APPLICATION NO. : 11/317202
DATED : October 6, 2009
INVENTOR(S) : Pedro A. Rivas It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 956 days.

Signed and Sealed this

Twenty-eighth Day of September, 2010

David J. Kappos
*Director of the United States Patent and Trademark Office*